(12) United States Patent  (10) Patent No.: US 7,837,540 B2
van den Nieuwelaar et al.  (45) Date of Patent: Nov. 23, 2010

(54) CONVEYOR DEVICE FOR SLAUGHTERED POULTRY

(75) Inventors: Adrianus Josephes van den Nieuwelaar, Gemeri (NL); Wilbert Hiddink, Varsseveld (NL); Theodorus Cornelis Reijn, Kranenburg (DE)

(73) Assignee: Stork PMT B.V., Boxmeer (NL)

( * ) Notice: Subject to any disclaimer, the term of this patent is extended or adjusted under 35 U.S.C. 154(b) by 574 days.

(21) Appl. No.: 11/883,230

(22) PCT Filed: Jan. 12, 2006

(86) PCT No.: PCT/NL2006/000017

§ 371 (c)(1),
(2), (4) Date: Oct. 2, 2007

(87) PCT Pub. No.: WO2006/080834

PCT Pub. Date: Aug. 3, 2006

(65) Prior Publication Data

US 2008/0125025 A1  May 29, 2008

(30) Foreign Application Priority Data

Jan. 28, 2005  (NL) .................................... 1028142

(51) Int. Cl.
*A22C 18/00* (2006.01)
(52) U.S. Cl. .................................................... 452/177
(58) Field of Classification Search ................ 452/182, 452/183, 177, 179, 180
See application file for complete search history.

(56) References Cited

U.S. PATENT DOCUMENTS

| 3,643,293 A | * | 2/1972 | Rejsa et al. ................. 452/182 |
| 3,944,078 A | | 3/1976 | Altenpohl |
| 4,034,440 A | | 7/1977 | van Mil et al. |
| 4,178,659 A | | 12/1979 | Simonds |
| 4,553,045 A | * | 11/1985 | Murotani ..................... 326/22 |
| 4,597,133 A | * | 7/1986 | van de Nieuwelaar ...... 452/182 |
| 4,813,101 A | * | 3/1989 | Brakels et al. .............. 452/182 |
| 5,453,045 A | | 9/1995 | Hobbel et al. |

FOREIGN PATENT DOCUMENTS

| DE | 34 45 678 A1 | 6/1986 |
| EP | 0 155 014 A1 | 2/1985 |
| EP | 0 259 920 A1 | 8/1987 |
| NL | 6511938 | 3/1967 |
| WO | WO-86/06587 A1 | 11/1986 |

* cited by examiner

*Primary Examiner*—Thomas Price
(74) *Attorney, Agent, or Firm*—Birch, Stewart, Kolasch & Birch, LLP

(57) ABSTRACT

A conveyor device for conveying slaughtered poultry or one or more pieces thereof, comprising a plurality of carriers, each suitable for carrying slaughtered poultry or one or more pieces thereof. The device also comprises at least one guide which supports the carriers and guides them such that they can move in a conveying direction, a drive member which advances parallel to the guide for jointly driving a plurality of carriers in the conveying direction, and coupling means associated with each carrier for coupling the carrier to the drive member. The conveyor device is also provided with decoupling means, which can be actuated by an actuating member, for selectively decoupling one or more of the carriers from the drive member.

30 Claims, 13 Drawing Sheets

CONVEYOR DEVICE FOR SLAUGHTERED POULTRY

Figure 1:
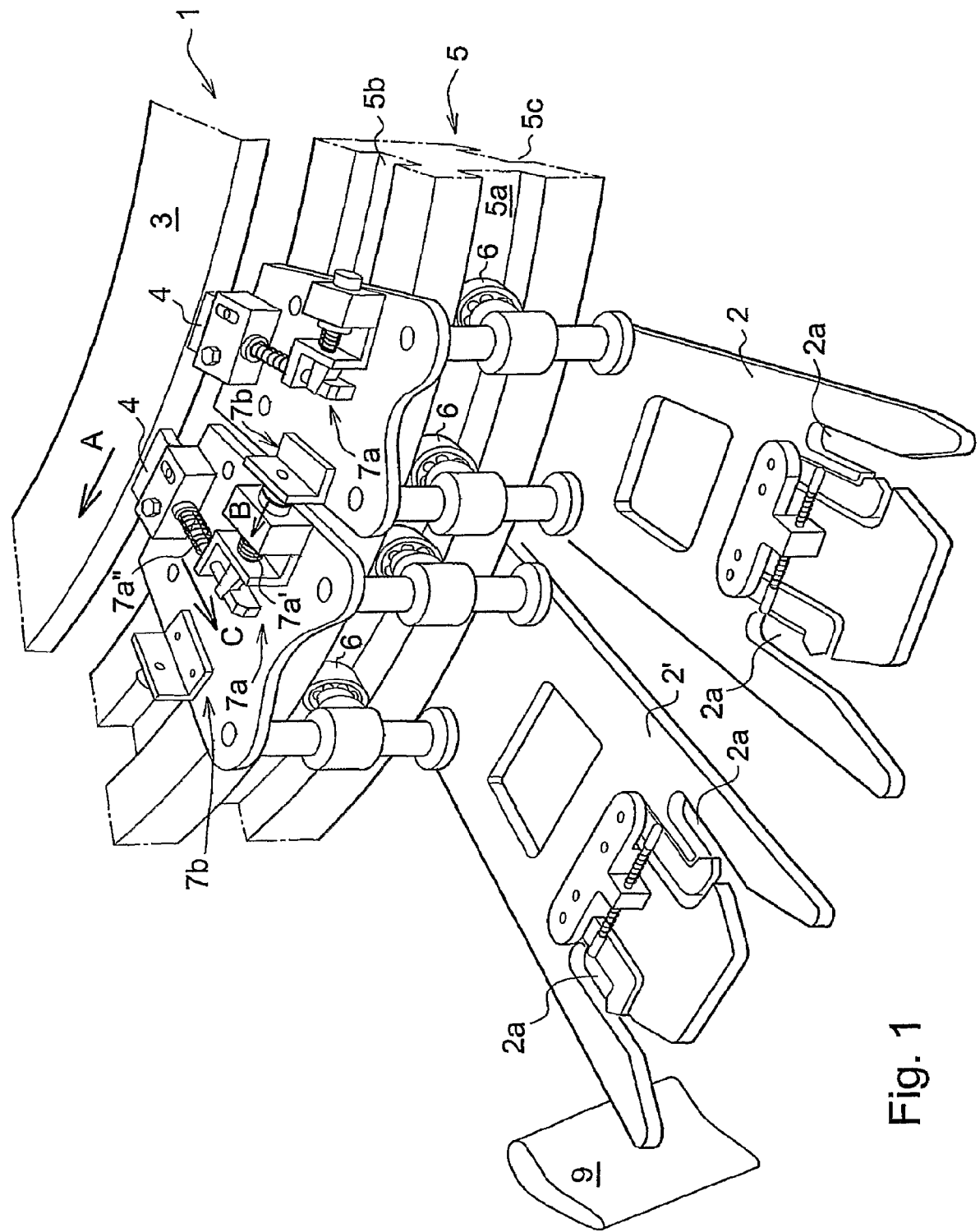

A first aspect of the invention relates to a conveyor device for conveying slaughtered poultry or pieces of slaughtered poultry, comprising a plurality of carriers, each suitable for carrying slaughtered poultry or one or more parts thereof, at least one guide which supports the carriers and guides them such that they can move in a conveying direction, a drive member which advances parallel to the guide for jointly driving a plurality of carriers in the conveying direction, and also coupling means associated with each carrier for coupling the carrier to the drive member.

A conveyor device of this type is known, for example, from EP 0 259 920 in the name of the present Applicant. The carrier is in this case an overhanging hook which is known from EP 0 155 014, likewise in the name of the present Applicant, which in a conveyor device, in this case a transfer station, can transfer pieces of slaughtered poultry from a first processing line to a second processing line. The known conveyor device has a fixed annular guide track with a drive ring driven continuously in the conveying direction arranged concentrically with it, which two elements interact with the overhanging hooks. The overhanging hooks are guided along the annular guide track by means of sets of running wheels and are driven in the conveying direction by the rotating drive ring via friction blocks. The coupling means are thus formed by a friction block located on each overhanging hook. As seen in the conveying direction, there is a zone in which a number of hooks can accumulate. An accumulation zone is, for example, a buffer in which the carriers form a waiting line. In the embodiment shown, a blocking stop retains two hooks, with the result that they are no longer advanced by the drive ring, but rather bear in a slipping manner against it. Subsequent hooks also come to bear against one another and then bear against the drive ring in a slipping manner by way of their friction blocks. The blocking stop is generally released after a signal indicating that one or more hooks are permitted to advance further.

The action of this conveyor device is unsatisfactory.

The first object of the invention is to provide an improved conveyor device.

This object is achieved by a conveyor device according to the invention, the conveyor device also being provided with decoupling means, which are actuable by an actuating member, for selectively decoupling one or more of the carriers from the drive member.

One advantage of this is that the decoupled carriers, if they are held in a stationary position, for example in a buffer, do not exert any braking action on the drive member. As a result, in certain embodiments the drive means will be less prone to wear.

On account of the possibility of selective decoupling, it is possible for a carrier to be decoupled as desired. For example, in regions where driving by the drive member is desired, it is possible to realize a fixed coupling. In particular in the case of a frictional coupling, it is then possible to ensure a good grip between the carriers and the drive member, even if the coupling means and/or the drive member become moist or wet in use. With a carrier according to the first aspect of the invention, therefore, the coupling force between carrier and drive member during conveying can be increased for each carrier compared to the known device, while the overall loading on the drive member remains constant or may even be reduced, on account of the fact that the coupling force of a plurality of carriers is eliminated by the decoupling, for example in a buffer. In particular at relatively high conveying speeds, it may be possible to obtain a significant reduction in wear and noise. It is also possible to improve the accuracy of the conveying device, since there is less risk of carriers unintentionally dropping out as a result of the accidental failure of the coupling to the drive member.

In a preferred embodiment of the first aspect of the invention, the coupling means effect a frictional coupling between the carrier and the drive member. In many known conveyor devices, including that shown in EP 0 259 920, use is already made of a frictional coupling. A frictional coupling is realized if the drive member comprises a friction surface and the carrier comprises a friction block. A coupling of this type has proven reliable for driving purposes, provided that wear is low, and is also simple to decouple.

One advantage of decoupling the friction-based coupling means of a carrier is that wear to the coupling means is prevented in regions where or at times at which driving of the carriers is not desired, for example in a buffer. In a decoupled state, the carrier is still connected to the guide, but the drive member continues to move without this decoupled carrier. The carrier is then, for example, stationary with respect to the advancing drive member. The coupling means will not then become worn, with the result that its engagement with the drive member no longer deteriorates undesirably over the course of time. When the coupling means is then coupled to the drive member again, the carrier is again driven along the guide in the conveying direction by the drive member. If, for example, the coupling means used is a friction block, in the decoupled state this block will no longer be connected in a slipping manner to the drive member, which would cause it to become worn.

In a preferred embodiment, the drive member comprises a rotating wheel with a frictional surface, with which the coupling means form a frictional coupling. An alternative drive member is, for example, a chain, a wire, a belt, a drum or a disc, which advances parallel to the guide and by which a plurality of carriers can be jointly driven in the conveying direction.

In an alternative embodiment of the first aspect of the invention, the coupling means effect a magnetic coupling between the carrier and the drive member. By way of example, the drive member comprises a magnetic strip, by which the coupling means comprising a magnetic part of opposite polarity are attracted, so that the coupling means are connected to the drive member in the coupled state. The decoupling means are then preferably likewise magnetic or electrical, with the result that the coupling magnet can be deactivated and activated. By way of example, a circuit is closed when carriers come into contact with one another, with the result that a movement of a coupling magnet which decouples the coupling magnet from the drive member is effected.

In a preferred embodiment of the first aspect of the invention, the guide comprises a rail, such as the known rail shown in EP 0 259 920. The carrier may, for example, be connected to the rail by means of sets of running rollers, so that the rail supports the carrier both when the carrier is coupled to the drive member and in the decoupled state.

In an alternative embodiment, the guide comprises a recess arranged along the drive member, in which part of the carrier can engage, in such a manner that when the carrier is not connected to the drive member, it is connected to the recess. By way of example, the recess is located circumferentially around a wheel around which a friction belt acts as drive member. As a result, the guide and the drive member can be designed in a single body, which simplifies the structure and can also simplify the structure of the carrier, can reduce wear and can lower the production costs of the conveyor device.

It is preferable for the coupling means to be connected to the carrier and designed in the form of a single body, which simplifies the structure. More advantageously, the decoupling means and the actuating member of the decoupling means are also connected to a carrier. As a result, an actuating member connected to a first carrier can decouple a coupling means connected to a second carrier. It is thus possible, in a buffer, for a second carrier, which is located behind a first carrier as seen in the conveying direction and catches up the first carrier, to be decoupled by decoupling means on the first carrier, provided that the carriers come into contact with one another with sufficient force and continue to bear against one another. On the other hand, it is also possible for a second carrier which catches up a first carrier to decouple a first carrier. In a buffer as described in EP 0 259 920, first carriers are retained by a blocking stop. If carriers which catch up these first carriers are decoupled by these first carriers, they will no longer be driven in a slipping manner, which reduces the force acting on the drive member. One advantage of this embodiment is that the blocking stop which controls the waiting line does not interact with the decoupling mechanism and the front carrier is therefore coupled in the usual way. As a result, this front carrier, if desired, can be conveyed onwards immediately. The carriers which catch it up are preferably decoupled immediately, so that the load on the drive member decreases immediately. One advantage of decoupling by means of an actuating member connected to a carrier is that decoupling can be used not only at fixed positions along a fixed section, but also for buffers of varying length or in the event of pile-ups.

In a preferred embodiment of the first aspect of the invention, the actuating member of the decoupling means comprises a projecting activation bearing which can actuate the decoupling means arranged on another carrier.

In an alternative embodiment, the actuating member of the decoupling means comprises an external mechanism that is not connected to the carrier. By way of example, decoupling means can be remotely actuated. In that case, the coupling and decoupling can be programmed or can take place in response to certain sensor signals. For example, coupling and therefore conveying of the carrier by means of the drive member in the conveying direction takes place if a sensor indicates that there is space in a specific production line to process poultry arranged on carriers. Coupling can also take place after a certain interval, when a product on the carrier has undergone a specific treatment in a buffer zone. Consideration may also be given to a carrier with a sensor which decouples itself if the sensor indicates that another carrier is coming (too) close.

In a preferred embodiment, the decoupling means comprise mechanical means, such as for example a lever. By way of example, this lever is arranged on top of the carrier. A projecting activation member of a carrier which then catches it up can actuate the lever of a carrier in front of it in the conveying direction and can thereby decouple the coupling means. By way of example, the lever can move the coupling means to and from perpendicular to the drive member and thereby couple and decouple it.

In an alternative embodiment, the decoupling means comprise electrical means, pneumatic means or magnetic means.

The invention also relates to a carrier which is suitable for use in a conveyor device as described above.

Furthermore, the invention relates to a method for conveying slaughtered poultry or one or more pieces thereof, in which use is made of a conveyor device as described above. In a method of this type, the conveying of poultry can be controlled to the extent that carriers can be selectively decoupled from the drive member when desired.

More particularly, the invention relates to a method for slaughtering poultry, in which the slaughtered poultry or one or more pieces thereof are conveyed in a conveying device as described above. When this method is used, one or more of the carriers can be selectively decoupled from the drive member. By way of example, in buffers at other locations where there are waiting lines, carriers can be decoupled, so that the force exerted on the drive member by the carriers is reduced.

In a preferred embodiment, an actuating member of decoupling means which are connected to a first carrier decouples coupling means of a second carrier. By way of example, a carrier which catches up decouples the carrier which is in front of it and is being retained, or alternatively the carrier which is in front and is being retained decouples the carrier which catches it up. Preferably, if a plurality of carriers form a waiting line in a buffer, one or more carriers are decoupled in the buffer.

A second aspect of the invention relates to a conveyor wheel which is suitable for connection to a carrier for carrying at least one piece of poultry and for rolling along a guide, which conveyor wheel comprises an outer ring and an inner ring, between which there is a rolling bearing structure comprising metal rolling bearing elements.

Conveyor wheels of this type are generally known and form an important logistical component of a poultry slaughter house. All kinds of conveyor devices for conveying at least one piece of slaughtered poultry are equipped with wheels of this type. The conveyor devices comprise a plurality of carriers which are each suitable for carrying at least one piece of slaughtered poultry and are connected to the conveyor wheels. Since the conveyor wheel is used throughout the entire slaughter house under varying conditions, the properties of the material of the conveyor wheel are at least chemically resistant and resistant to solvent and moisture, and the material of the conveyor wheel has stable mechanical properties in the temperature range 0-90° C. Examples of such conditions include in cooling cells, during marinating treatments, steam treatments, during chemical cleaning of the carriers and the wheels, etc. Furthermore, it is important for the plastic to be hard and wear-resistant, since the inner ring and outer ring of the conveyor wheel are in constant frictional contact with the metal rolling bearing elements. To achieve a longer service life of the conveyor wheels, such internal wear to the plastic of the rolling bearing at the contact surface with the metal ball bearings needs to be prevented, and it is important for the conveyor wheel to be sufficiently hard.

In practice, the guides are made from steel, for example stainless steel. One drawback of the known conveyor wheel is that in the case of the conventional guides, the material from which the guide is made becomes worn as a result of the multiple guiding of the known conveyor wheels. This therefore means wear to the external guide by the hard plastic material of the rolling bearing. As a result, small worn particles are released, which is undesirable in the hygienic production conditions of a slaughter house. By way of example, the worn particles blacken the conveyor wheels, and consequently the conveyor wheels carry the wear particles everywhere. If the conveyor wheels enter a moist cooling environment, the particles can be entrained along the carrier with the cooling water and reach the product.

The second object of the invention is to provide an improved conveyor wheel.

This object is achieved by virtue of the fact that in the conveyor wheel according to the second aspect of the invention, around the outer ring there is arranged an annular running surface made from a plastic with different materials properties from the outer ring.

In a preferred embodiment, the running surface is made from a softer plastic than the outer ring. This softer plastic is preferably wear-resistant. It is also preferable for this plastic likewise to be chemically resistant, resistant to solvent and moisture and to have stable mechanical properties in the temperature range from 0-90° C. In practice, the guides are made from steel, for example stainless steel. It has been found that with the conveyor wheel according to the invention, the guide is subject to considerably less wear than when using the conventional conveyor wheels. This prevents the release of (metal) wear particles, which previously led to poultry products unsuitable for sale. Another advantage of a conveyor wheel according to the second aspect of the invention is that the noise produced by the wheels running along the guide is reduced. This improves the working conditions of the employees in the production area. To prevent the running surface coming off the conveyor wheel during intensive use, good attachment between the annular running surface and the outer ring is required.

Attachment between the outer ring and the annular running surface can be effected, for example, mechanically or chemically or by a combination thereof. By way of example, attachment is achieved by a set of depressions and elevations in the outer ring and in the annular running surface, which engage with one another. Good attachment can also be achieved by producing the outer ring and the annular running surface in a single production process, for example two-component injection moulding. Production and attachment then take place simultaneously. An alternative is adhesive bonding.

A suitable combination of materials is an inner ring and an outer ring made from POM (polyoxymethylene, also known as polyacetal) and an annular running surface made from a plastic selected from the group of polyurethanes (PU). It is preferable to use unfoamed polyurethane in solid form, such as pourable and injectable elastomers and rubber-like forms.

Furthermore, the second aspect of the invention relates to a conveyor device for conveying slaughtered poultry or one or more pieces thereof, which conveyor device comprises a guide and one or more carriers for carrying at least one piece of poultry, as well as conveyor wheels as described above for connecting to the carriers and rolling along the guide.

Figure 2:
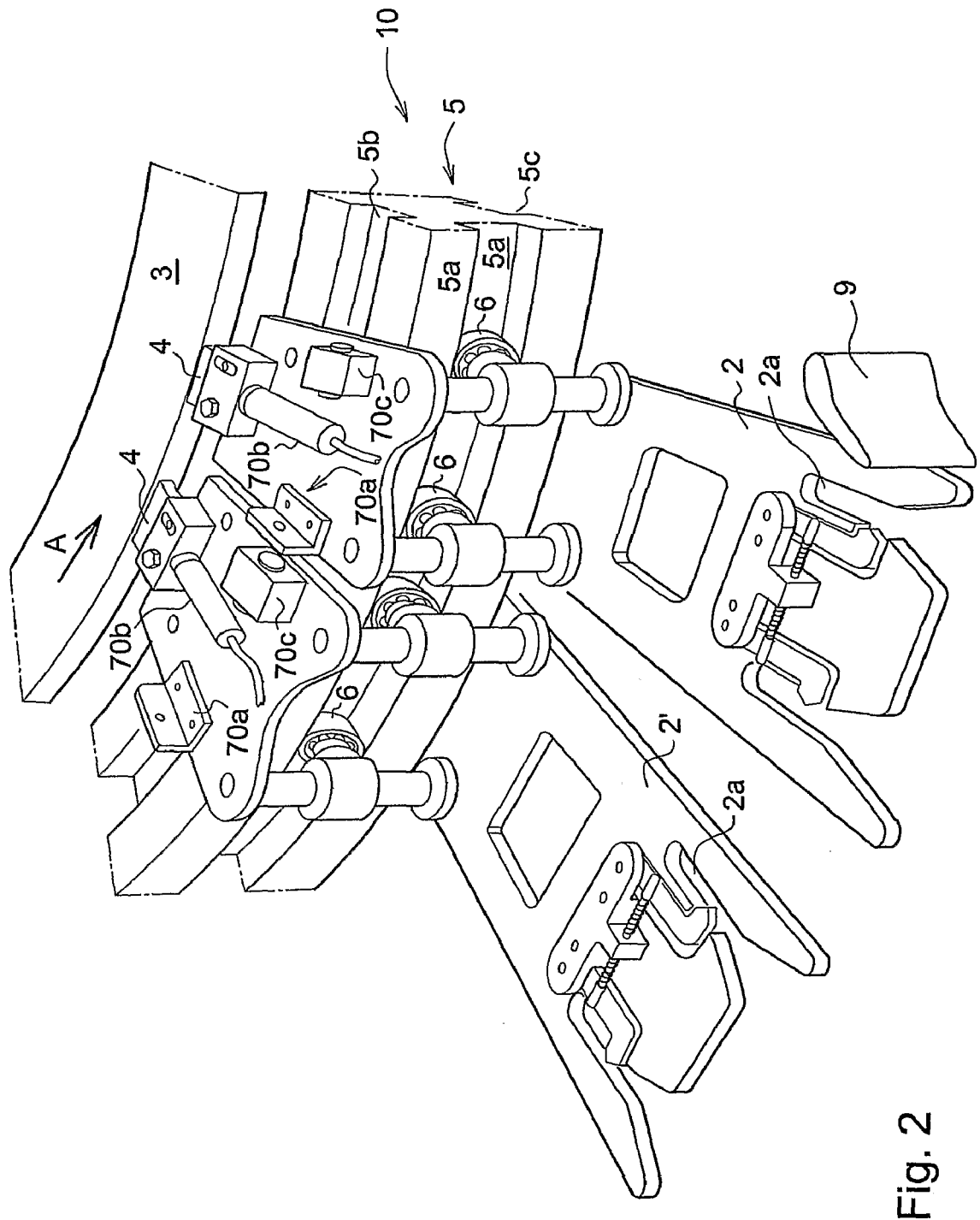
Figure 3:
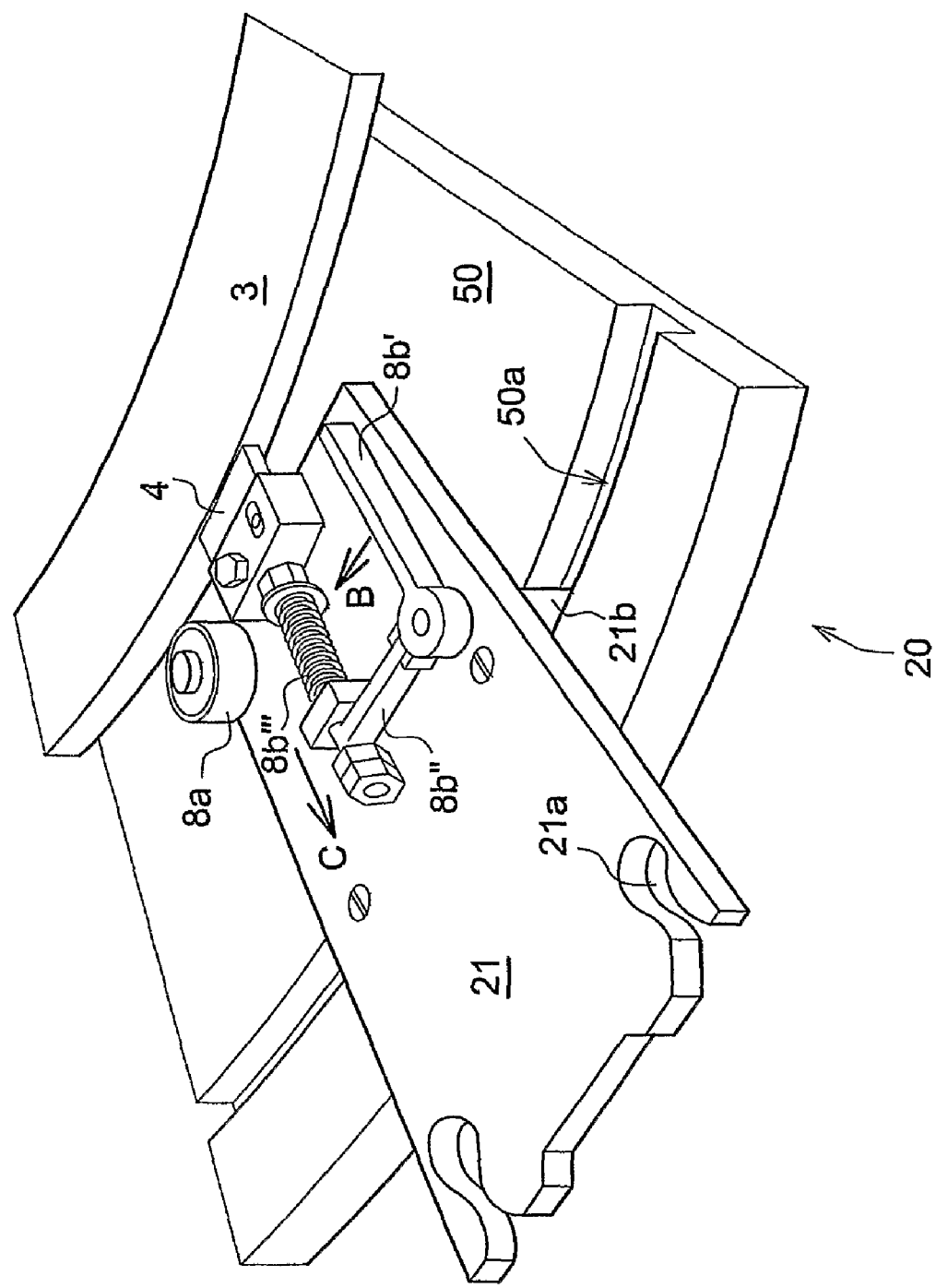
Figure 4:
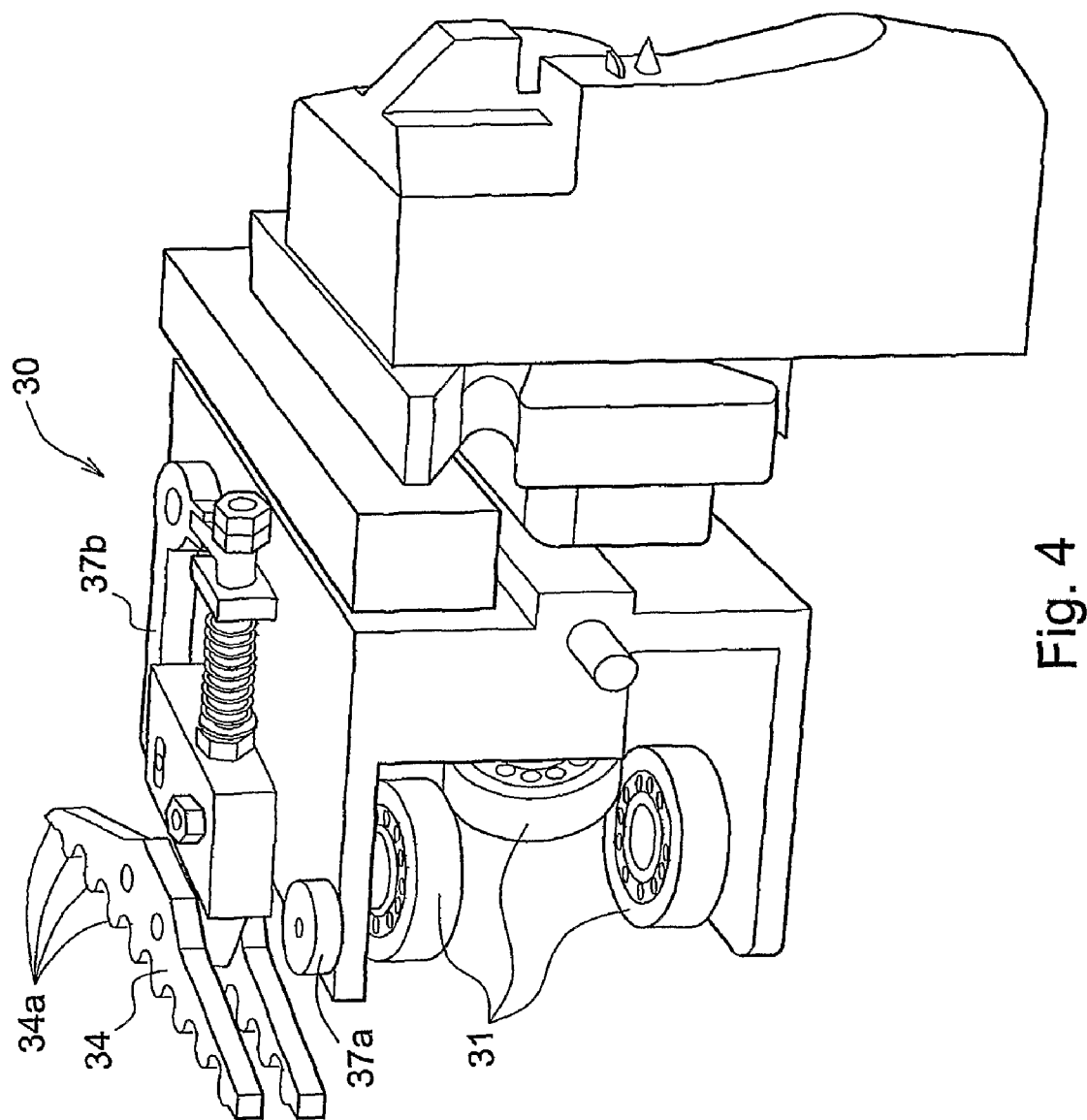
Figure 5:
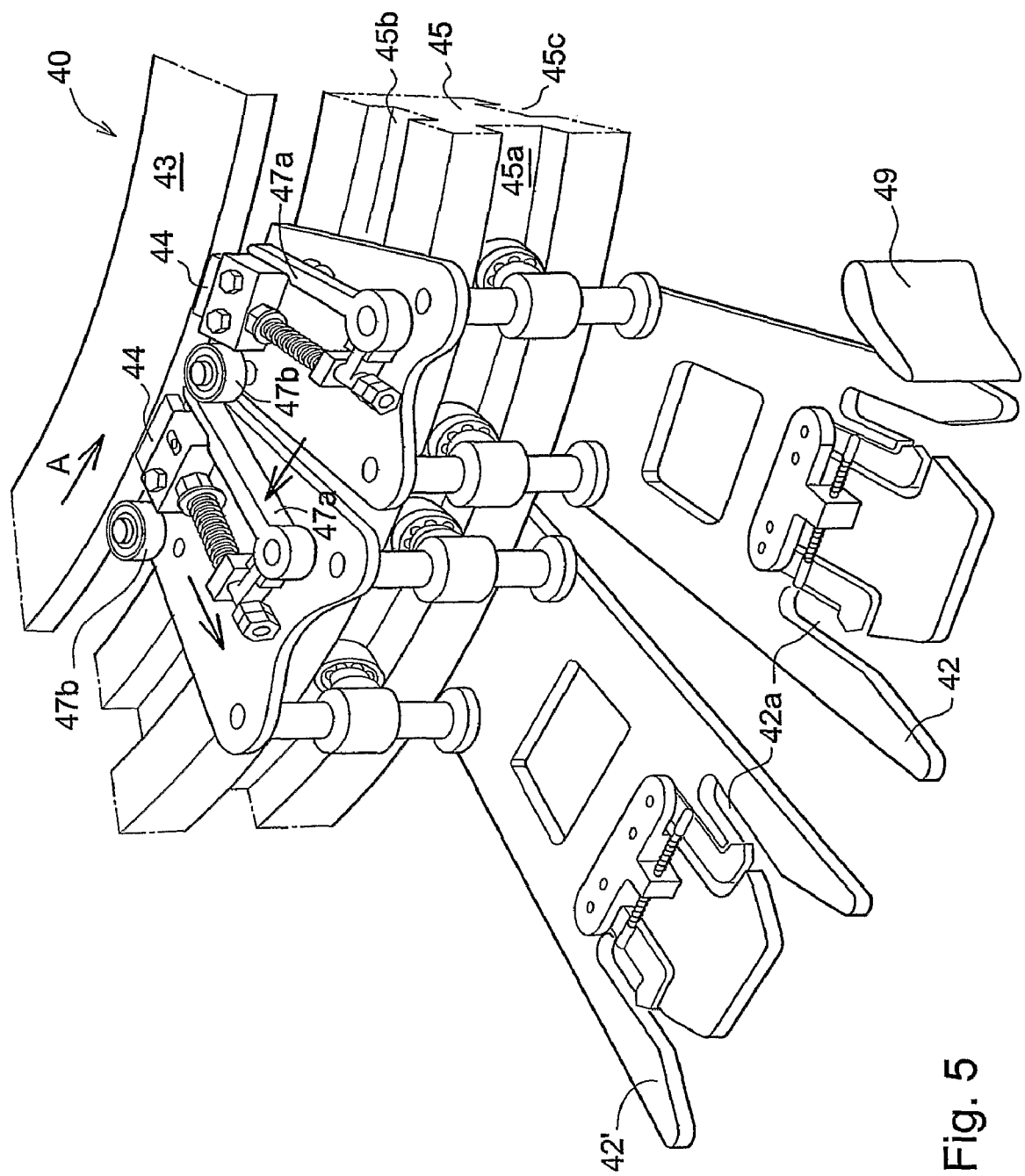
Figure 6:
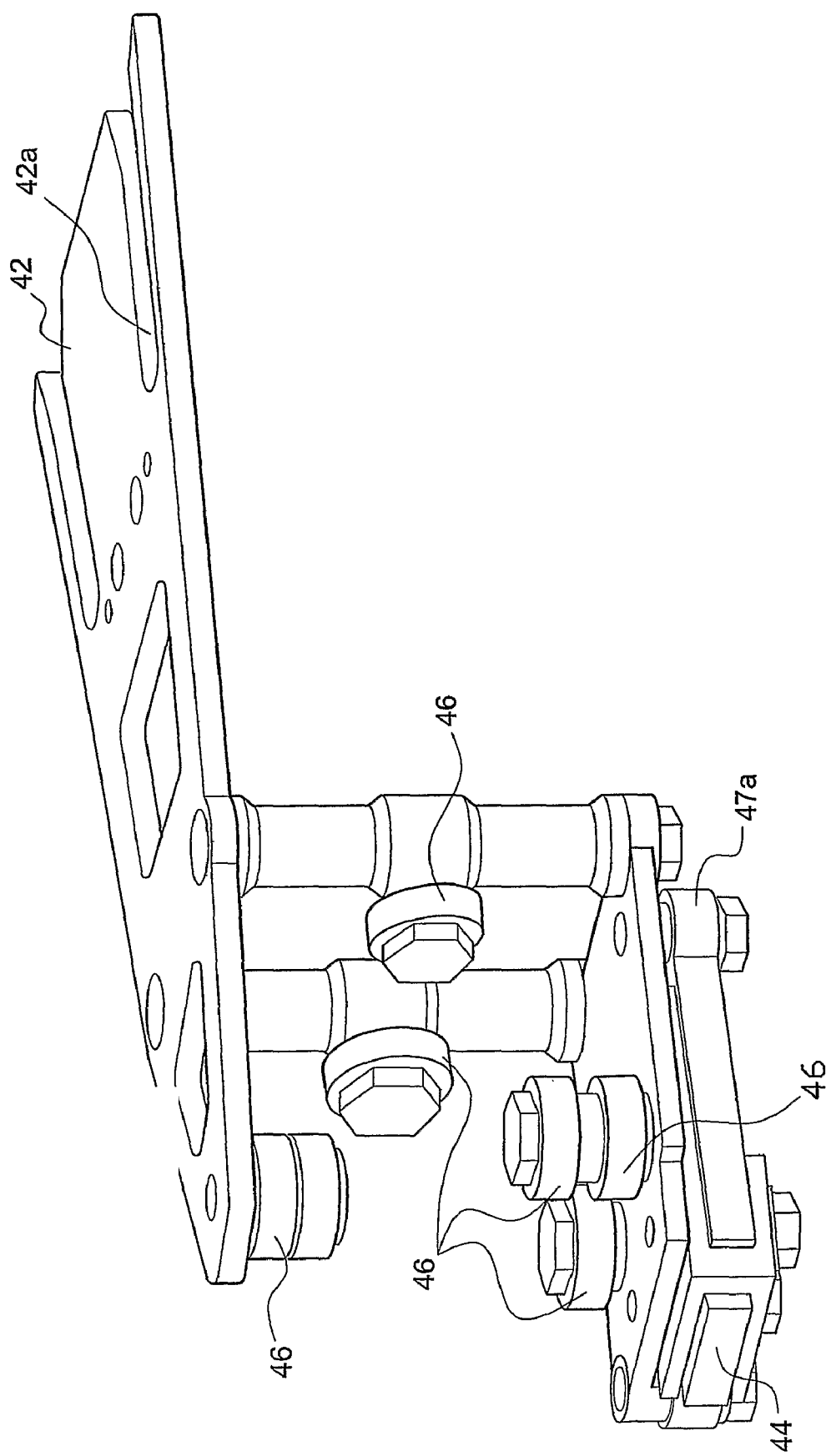
Figure 7:
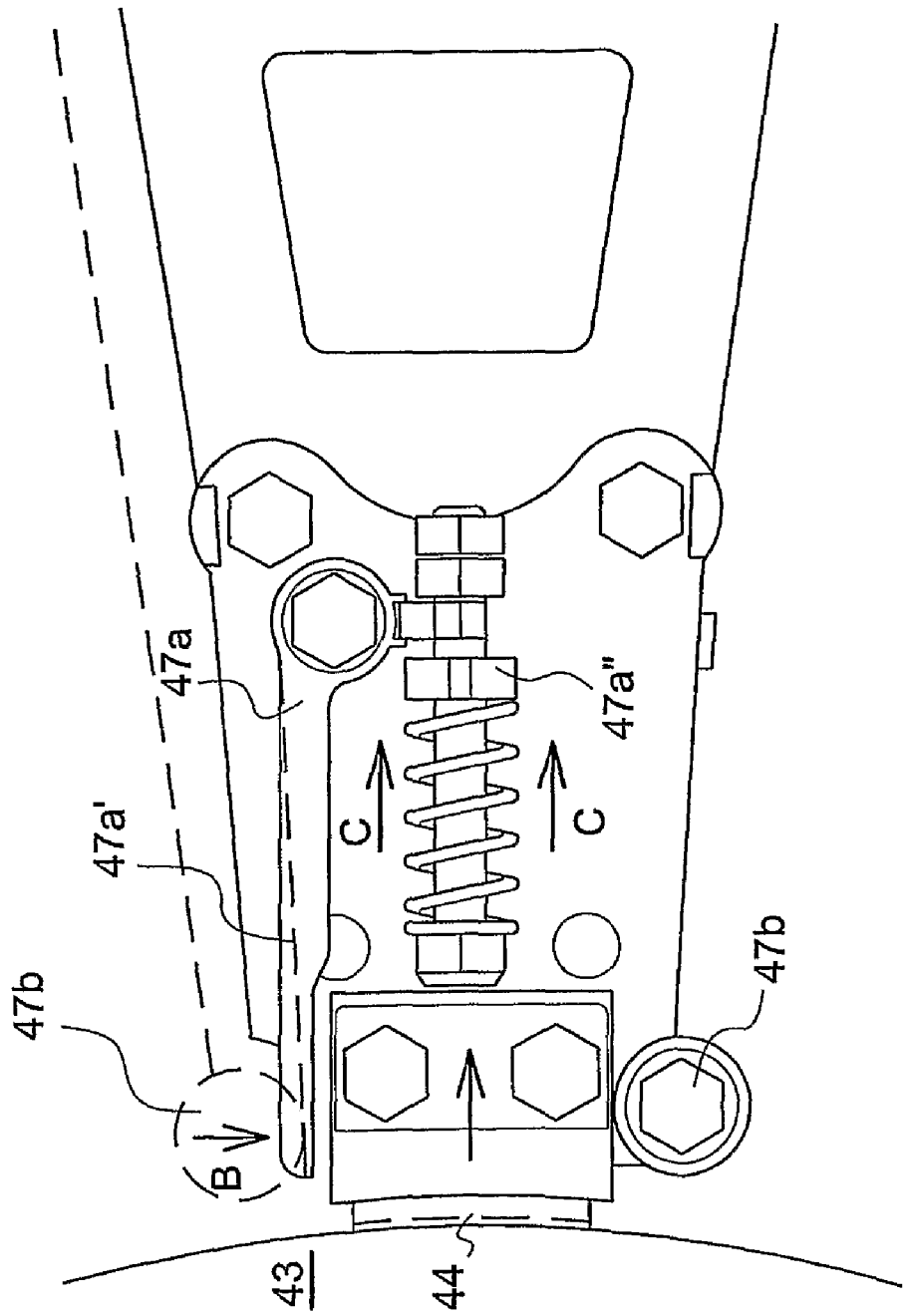
Figure 8:
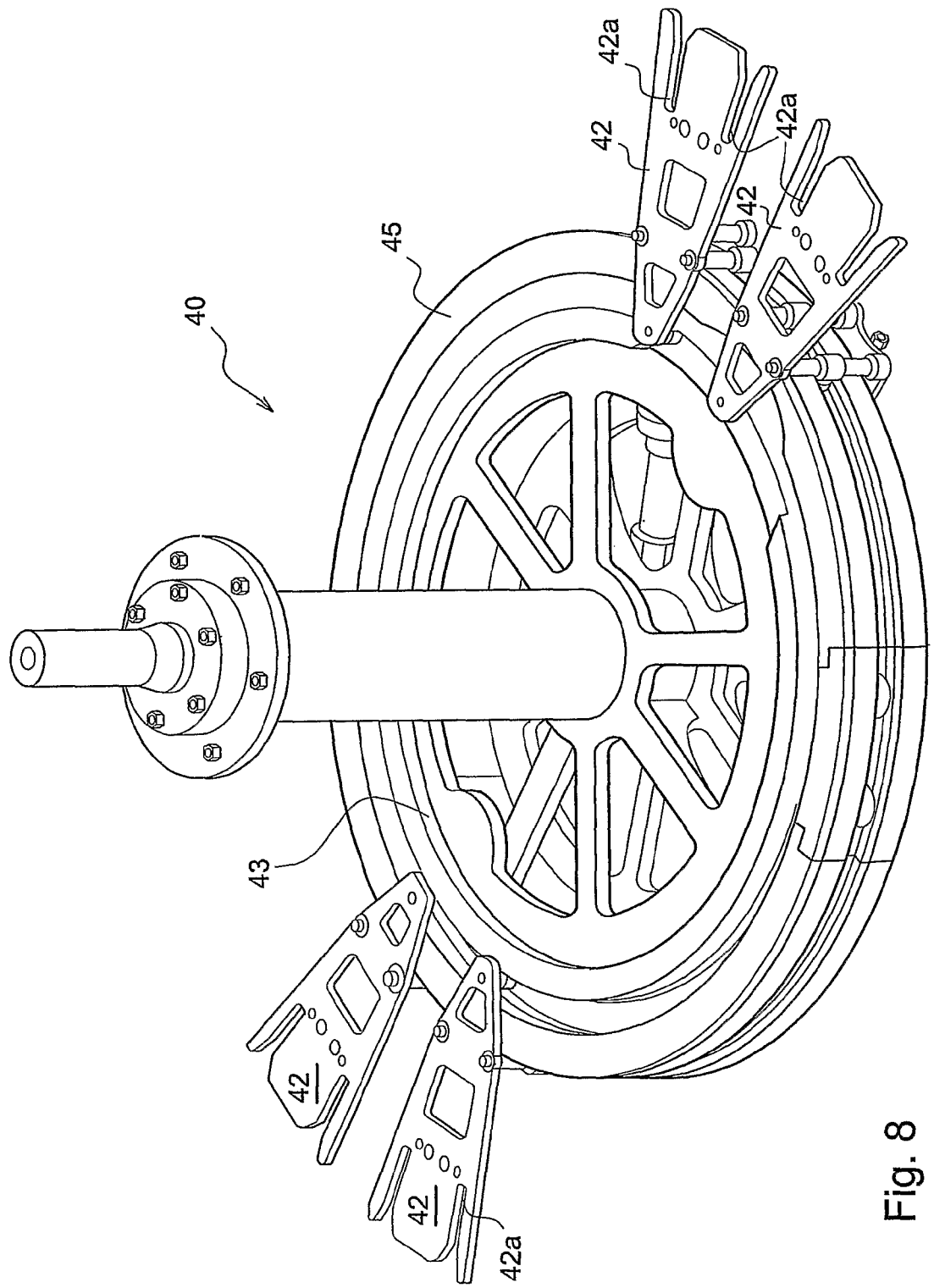
Figure 9:
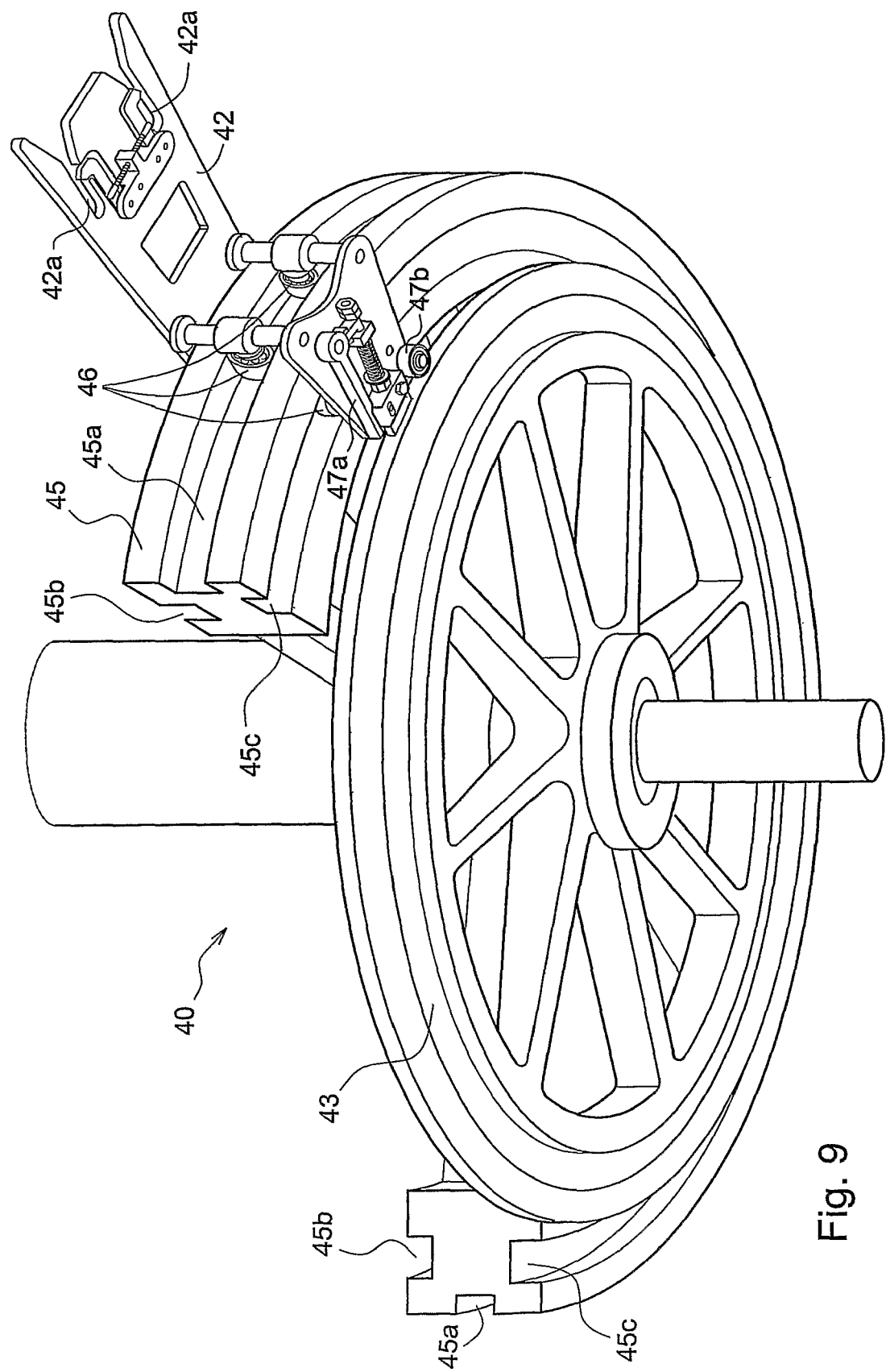
Figure 10:
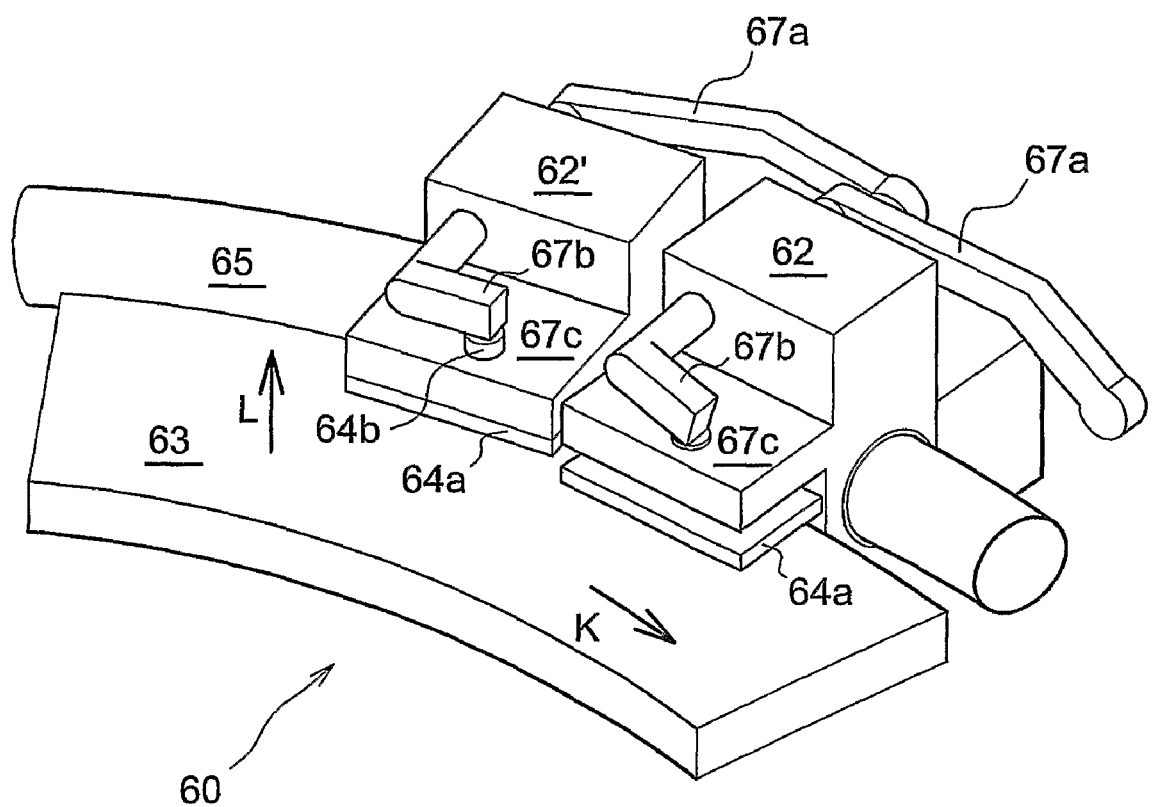
Figure 11:
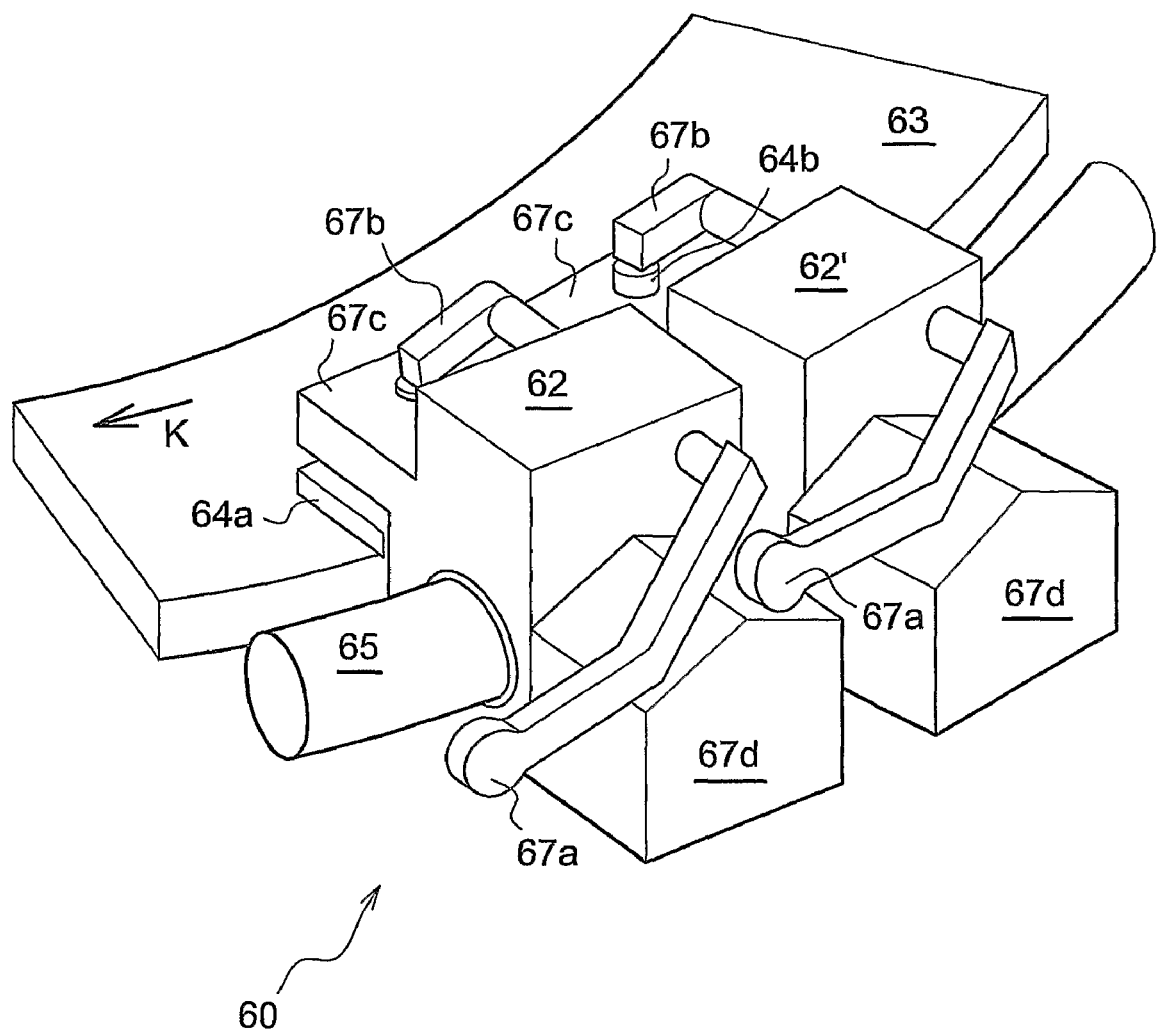
Figure 13:
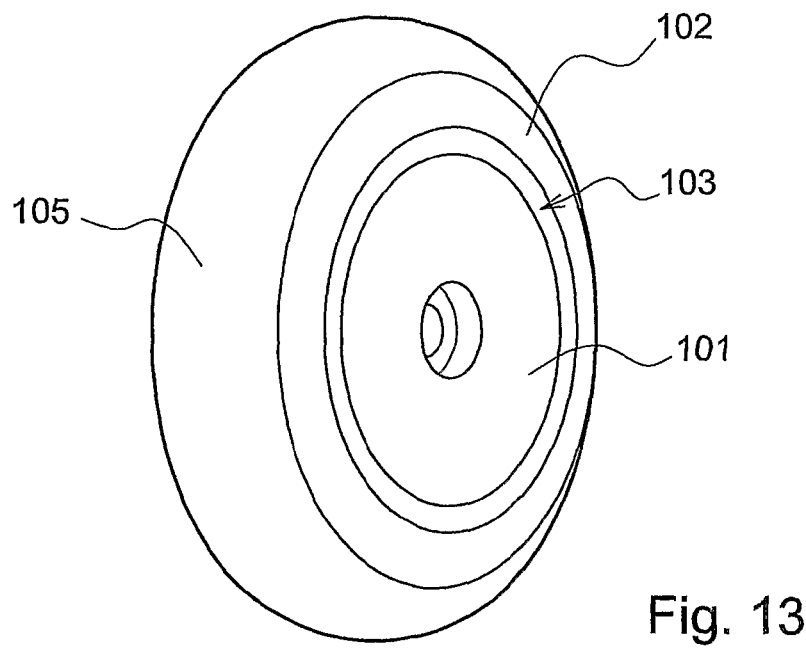
Figures 12, 14:
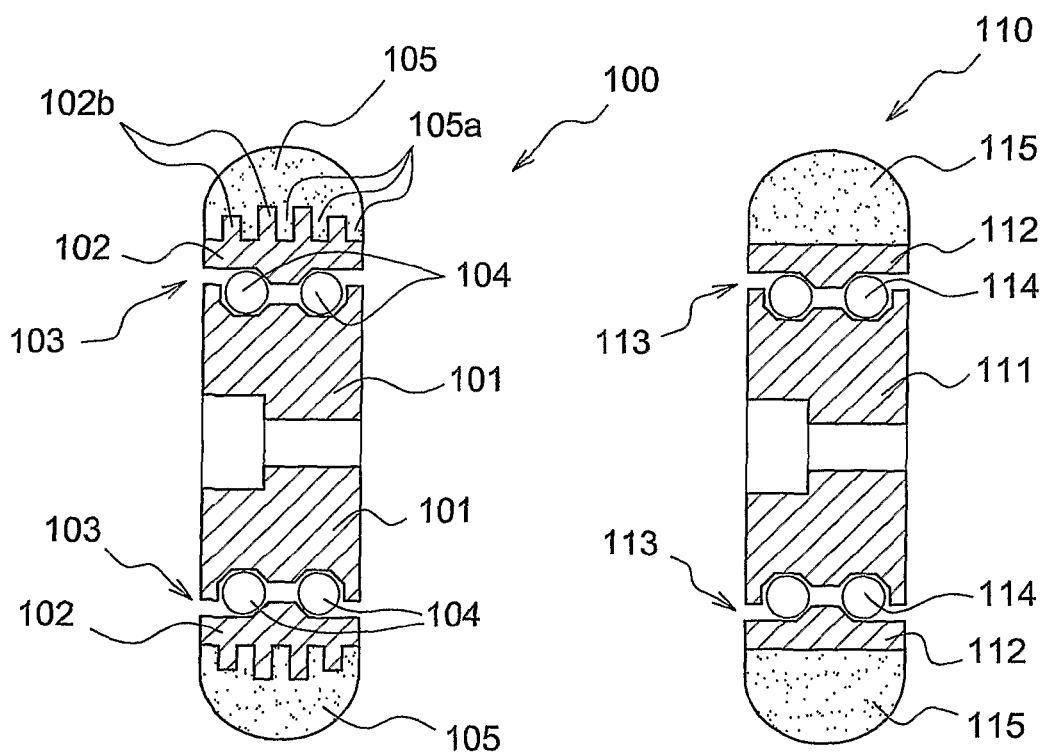
Figures 15A, 15B:
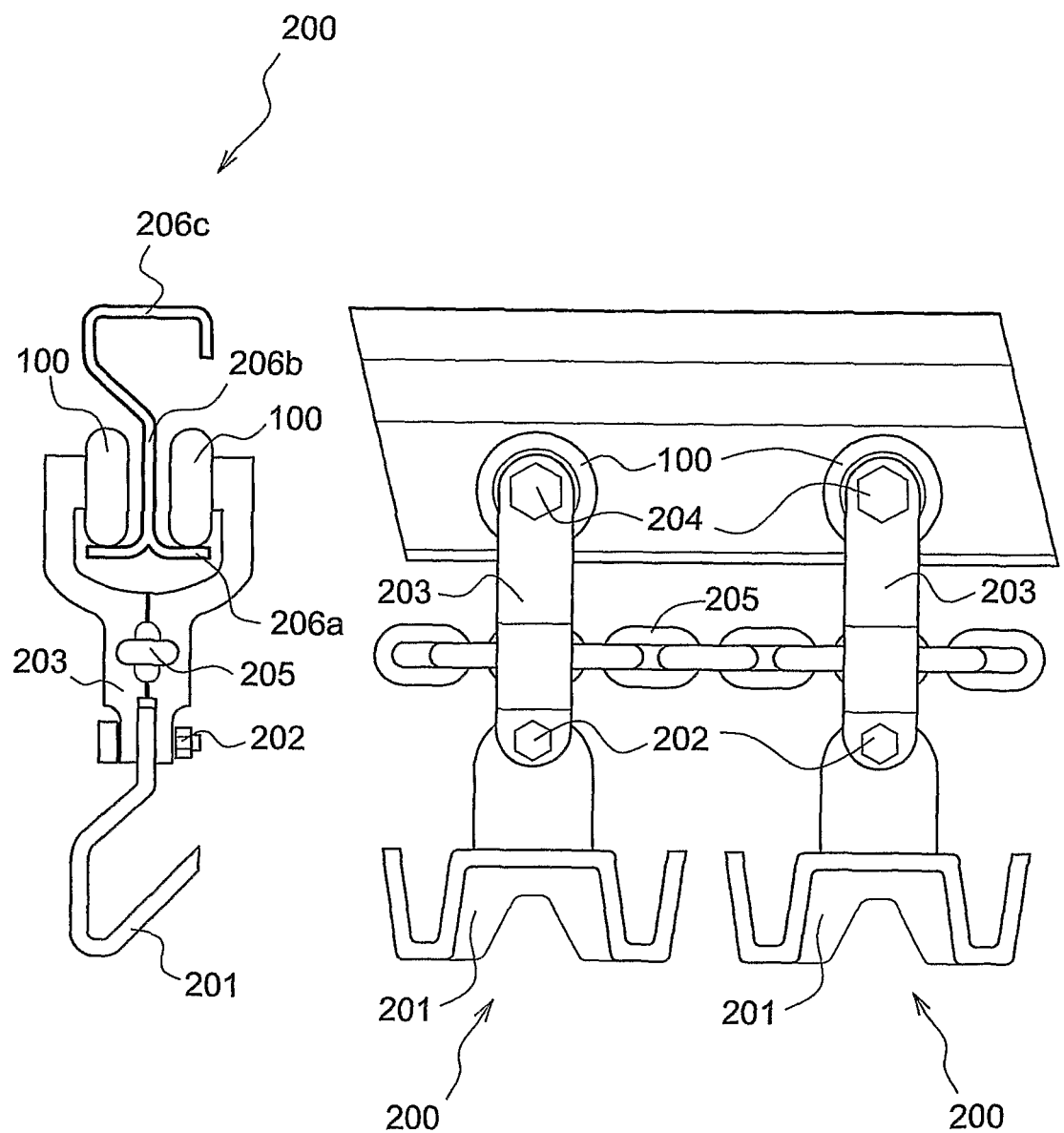

The invention will be explained below with reference to the drawing, in which:

FIG. 1 shows a view from below of an exemplary embodiment of a conveyor device according to the first aspect of the invention, FIG. 2 shows a view from below of an alternative embodiment of a conveyor device according to the first aspect of the invention, FIG. 3 shows a side view of a second alternative embodiment of a conveyor device according to the first aspect of the invention, FIG. 4 shows a second alternative embodiment of a carrier according to the first aspect of the invention, FIG. 5 shows a view from below of a fourth alternative embodiment of a conveyor device according to the first aspect of the invention, FIG. 6 shows a side view of the fourth alternative embodiment of a conveyor device according to the first aspect of the invention, FIG. 7 shows the action of the fourth alternative embodiment of a conveyor device according to the first aspect of the invention, FIG. 8 shows a view from above of the fourth alternative embodiment of a conveyor device with the drive means according to the first aspect of the invention, FIG. 9 shows a view from below of the fourth alternative embodiment of a conveyor device with the drive means according to the first aspect of the invention, FIG. 10 shows a side view of a fifth alternative embodiment of a conveyor device according to the first aspect of the invention, FIG. 11 shows an alternative side view of the fifth alternative embodiment of a conveyor device according to the first aspect of the invention, FIG. 12 shows an embodiment of a conveyor wheel according to the second aspect of the invention, FIG. 13 shows a perspective view of the embodiment of the conveyor wheel from FIG. 12, FIG. 14 shows an alternative embodiment of a conveyor wheel according to the second aspect of the invention, FIG. 15a and FIG. 15b show a use of a conveyor wheel according to the second aspect of the invention.

FIG. 1 shows a view from below of an exemplary embodiment of a conveyor device 1 according to the first aspect of the invention for conveying at least one piece of slaughtered poultry (not shown). By way of example, the conveyor device, which is to be described in more detail below, is designed as a transfer means between two conveyor paths, in particular as a buffer transfer means.

The conveyor device 1 comprises a plurality of carriers 2, two 2 and 2' of which are shown here, each suitable for carrying the slaughtered poultry (not shown). In the carrier shown here, which is known per se, the legs of slaughtered poultry can be suspended in the cutouts 2a. The conveyor device 1 also comprises a guide 5, which supports the carriers 2 and guides them such that they can move in a conveying direction A. The guide 5 is in this case designed as a rail with a substantially square cross section and three recesses 5a, 5b and 5c, within which guide wheels 6 can advance. In the embodiment shown, only wheels 6 in the recess 5a are visible. The carriers 2 are connected to the rail 5 in such a manner that they cannot simply fall off it. The guide 5 is enclosed within the carrier 2 inside the three guide wheels 6.

Furthermore, the conveyor device 1 comprises a drive member 3 which advances parallel to the guide and can be used to move a plurality of carriers 2 jointly in the conveying direction A, as well as coupling means 4 associated with each carrier 2, by means of which coupling means the carriers 2 can be coupled to the drive member 3. The drive member 3 is in this case based on a mechanical principle and comprises an endlessly advancing rotating wheel with a friction belt, against which coupling means 4 designed as friction blocks press in the coupled state. The coupling means 4 designed as friction blocks are connected to the carrier. The friction blocks comprise a friction surface (not shown), which in the coupled state effects a frictional coupling between the carrier and the drive member. In FIG. 1, the right-hand carrier 2 is coupled to the drive member 3 by means of the coupling means 4. The left-hand carrier 2' is not coupled to the drive member 3; it can be seen that the coupling means 4 is a certain distance away from the drive member 3. However, the guide wheels 6 can still be supported on the guide 5, with the result that the carrier 2' remains connected to the guide 5.

In the conveyor device 1, the coupling means 4 between the carriers 2 and the drive member 3 can be decoupled by means of decoupling means 7. The decoupling means 7 comprise a projecting activation bearing 7b and a lever 7a, each arranged on a different side of the carrier 2.

If only the carrier 2' is present on the guide 5, it will be in a state in which it is coupled to the drive member 3. The lever mechanism is in the at-rest state and the coupling means 4 then engage on the drive member 3. The friction block 4 is therefore constantly pressed against the friction belt 3. In an alternative embodiment (not shown), it is possible to opt for an at-rest state in which the coupling means are not coupled to the drive member.

As seen in the conveying direction A, there is a blocking stop 9 in front of a first carrier 2'. This blocking stop prevents carrier 2' from advancing in the direction A, irrespective of whether or not it is coupled to the drive member 3 via the coupling means 4. When the carrier 2' comes into contact with the blocking stop 9, it will still be in a coupled state and will therefore be connected in a slipping manner to the friction belt 3.

In the position shown, a second carrier 2 has run into the first carrier 2'. When the projecting activation bearing 7b of the second carrier 2 comes into contact with the lever 7a of a first carrier 2', the lever 7a of the first carrier 2' decouples the friction block 4 of the first carrier 2', with the result that the first carrier 2' is no longer driven by the friction belt 3, as shown in FIG. 1. In detail, the following occurs: the projecting activation bearing 7b moves a first part 7a' of the lever in the direction indicated by arrow B, and then the first part 7a' moves a second part of the lever 7a" in the direction indicated by arrow C, with the result that the coupling means 4 connected to this second part 7a" is uncoupled from the drive member 3. If the lever 7a' is not activated by a projecting activation bearing and is in an at-rest position, springs arranged on both parts of the lever 7a' and 7a" ensure that the coupling means 4 remain coupled to the drive member 3. These springs are compressed in the coupled, activated state.

If the blockage 9 which is blocking this first carrier 2' is eliminated, the second carrier 2 will push the first carrier 2' onwards, since the second carrier 2 is coupled to the drive member 3 and is therefore advancing in direction A. If the force with which the second carrier 2 pushes against the first carrier 2' is high enough, the springs of the lever parts 7a' and 7a" will remain depressed and the first carrier 2' will remain decoupled. If this force is insufficiently high, the springs of the lever parts 7a' and 7a" will spring back to their starting position, in which the friction block 4 is once again pressed against the drive member 3 and the carrier 2' is in the coupled state. This will also occur if the second carrier 2 encounters the blockage 9 which was previously blocking the first carrier 2'. The second carrier 2 then no longer pushes on the first carrier 2' at all, and consequently the lever mechanism thereof will spring back into the coupled state.

FIG. 2 shows a view from below of an alternative embodiment of a conveyor device 10 according to the first aspect of the invention. The conveyor device comprises the same type of carriers 2 and 2', guide 5 with recesses 5a, 5b and 5c, drive member 3 and coupling means 4 as shown in FIG. 1. In the embodiment shown in FIG. 2, the decoupling means 70 comprise a sensor 70c connected to a pneumatic decoupling 70b which can decouple the coupling means 4 from the drive member 3. If the sensor 70c is activated by an activation 70a from a carrier located nearby, the pneumatic decoupling means 70b are energized and decouple the coupling means 4. It is possible for the sensor used to be a light sensor and for the activation 70a used to be a small plate which can cover the sensor and thereby changes the light signal which is received.

In the embodiment shown in FIG. 2, a blocking member 9 is located next to the right-hand carrier 2. As a result, the latter cannot advance in the conveying direction A, even though the coupling means 4 of carrier 2 are engaging on the drive member 3. The carrier 2 is therefore connected in a slipping manner to the drive member 3. The sensor 70c of the carrier 2' which catches up the carrier 2 receives a signal from the signal generator 70a of the right-hand carrier 2, with the result that pneumatic means 70b on the left-hand carrier 2' decouple the coupling means 4 of the left-hand carrier 2'. The carriers which are catching up are thus decoupled. Only when the first carrier 2 is able to advance again, on account of the blockage 9 having been eliminated, will the sensor 70c on the carrier 2' which is catching up no longer receive a signal, with the result that the pneumatic means on carrier 2' will couple the coupling means 4 to the drive member 3 again.

FIG. 3 shows a side view of a second alternative embodiment of a conveyor device 20 according to the first aspect of the invention. The conveyor device 20 comprises a guide 50 with a recess 50a which runs next to the drive member 3. Carrier 21 with cutouts 21a for, for example, legs of poultry is connected to the guide 50 by means of a projection 21b in the recess 50a. The carrier 21 is connected to the drive member 3 with the aid of coupling means 4. The coupling means 4 can be decoupled with the aid of decoupling means 8. The decoupling means 8 comprise a lever 8b and a projecting activation bearing 8a which can actuate the lever 8b. When a projecting activation bearing of a second carrier (not shown) on the right-hand side in the figure comes into contact with the part of the lever 8b' of the first carrier shown, the lever part 8b' moves in the direction indicated by arrow B and the lever parts 8b" and 8b''' move in the direction indicated by arrow C, with the result that the coupling means 4 comes off the drive member 3 and the carrier is no longer exerting any force on the drive member. Springs arranged around lever part 8b''' ensure that if the lever 8b is not activated, it is in an at-rest position in which the coupling means 4 engage on the drive member 3. In the activated state, the spring around lever part 8b''' is compressed.

FIG. 4 shows a third alternative embodiment of a carrier 30 in accordance with the first aspect of the invention. This carrier 30 is suitable to be guided along a guide such as the rail 5 shown in FIG. 1 and FIG. 2 with recesses 5a, 5b and 5c, along which recesses 5a, 5b and 5c guide wheels 31 can advance. The carrier 30 comprises coupling means 34 with teeth 34a which can engage on a gear wheel, chain or rubber conveyor belt with teeth on the outside, used as the guide. Furthermore, the carrier 30 comprises a projecting activation bearing 37a and a lever 37b, which together form the decoupling means.

FIGS. 5-9 show a fourth alternative embodiment of a conveyor device 40 according to the first aspect of the invention. The conveyor device 40 comprises a plurality of carriers 42, two 42 and 42' of which are shown in FIG. 5, each suitable for carrying the slaughtered poultry (not shown). In the carrier shown here, which is known per se, the legs of slaughtered poultry can be suspended in the cutouts 42a. The conveyor device 40 also comprises a guide 45 along which the carriers 42 can move in a conveying direction A and to which each of the carriers 42 is connected. The guide 45 is in this case designed as a rail with a substantially square cross section with three recesses 45a, 45b and 45c, in which guide wheels 46 can advance. Furthermore, the conveyor device 40 comprises a drive member 43 which advances parallel to the guide and by which a plurality of carriers 42 can be jointly moved in the conveying direction A, as well as coupling means 44 associated with each carrier 42, by which the carriers 42 can be coupled to the drive member 43. The drive member 43 is in this case based on a mechanical principle and includes an endlessly advancing rotating wheel with a friction belt, against which coupling means 44 designed as friction blocks press in the coupled state. The coupling means 44 designed as friction blocks are connected to the carrier. The friction blocks 44 comprise a friction surface (not shown), which in the coupled state effects a frictional coupling between the carrier 42 and the drive member 43. In FIG. 5, the right-hand carrier 42 is coupled to the drive member 43 by means of the coupling means 44. The left-hand carrier 42' is not coupled to the drive member 43; it can be seen that the coupling means 44 is a certain distance away from the drive member 43. However, the guide wheels 46 can still be supported on the guide 45, with the result that the carrier 42' remains connected to the guide 45.

In the conveyor device 40, the decoupling means 44 between the carriers 42 and the drive member 43 can be decoupled by means of decoupling means 47. The decoupling means 47 comprise a projecting activation bearing 47b and a lever 47a, each arranged on a different side of the carrier 42.

If only the carrier 42 is present on the guide 45, it will be in a state in which it is coupled to the drive member 43. The lever mechanism is in the at-rest position, and the coupling means 44 then engage on the drive member 43. The friction block 44 is therefore constantly pressed against the friction belt 43. As seen in the conveying direction A, there is a blocking stop 49 in front of a first carrier 42. This blocking stop prevents the carrier 42 from advancing in direction A. When the carrier 42 comes into contact with the blocking stop 49, it will still be in the coupled state and will therefore be connected in a slipping manner to the friction belt 43.

In the position shown, a second carrier 42' has run into the first carrier 42. When the projecting activation bearing 47b of the first carrier 42 comes into contact with the lever 47a of a second carrier 42', the lever 47a of the second carrier 42' decouples the friction block 44 of the second carrier 42', with the result that the second carrier 42' is no longer driven by the friction belt 43, as shown in FIG. 5. FIG. 7 shows the action of the lever mechanism in detail, with the uncoupled state indicated by dashed lines. The projecting activation bearing 47b of a colliding carrier moves a first part 47a' of the lever in the direction indicated by arrow B, and then the first part 47a' moves a second part of the lever 47a''' in the direction indicated by arrow C, with the result that the coupling means 44 connected to this second part 47a''' is uncoupled from the drive member 43. When the lever 47a' is not activated by a projecting activation bearing and is in an at-rest state, a spring arranged on the lever part 47a''' ensures that the coupling means 44 remain coupled against the drive member 43. These springs are compressed in the coupled, activated state.

FIG. 10 and FIG. 11 show side views of a fifth alternative embodiment of a conveyor device 60 according to the first aspect of the invention. The conveyor device 60 comprises a plurality of carriers 62, two 62 and 62' of which are shown, for carrying slaughtered poultry (not shown). Furthermore, the device comprises a guide 65 along which the carriers 62 can move in a conveying direction K and to which each of the carriers 62 is connected. An advancing drive member 63 for jointly driving the carriers 62 in the conveying direction K is parallel to the guide 65. Each carrier 62 has associated coupling means 64 for coupling the carrier 62 to the drive member 63.

The coupling means 64 comprise a plate-like frictional body 64a and a projection 64b connected to it. The conveyor device 60 is also provided with decoupling means 67a, 67b and 67d for selectively decoupling one or more of the carriers 62. The carrier 62' is decoupled in FIGS. 10 and 11. The actuating member 67a of the carrier 62' which catches up the carrier 62 comes into contact with the activation member 67d connected to carrier 62. As a result, the actuating member 67a is actuated and it moves the decoupling member 67b connected to it, resulting in a movement of the coupling means 64 in the upwards direction, indicated by the arrow L. In the process, the projection 64b moves through part 67c connected to the carrier.

FIG. 12 and FIG. 13 show an embodiment of a conveyor wheel 100 according to the second aspect of the invention. The conveyor wheel 100 shown is suitable for being connected to a carrier for carrying at least a piece of slaughtered poultry and for being conveyed along a guide. By way of example, the conveyor wheel 100 is used at carrier 2 as shown in FIG. 1, at the location of the guide wheel 6. The guide wheels 31 as shown in FIG. 4 can also be designed as conveyor wheels 100 according to the second aspect of the invention. The conveyor wheel 100 comprises an inner ring 101 and an outer ring 102, between which there is a ball bearing structure 103 comprising metal ball bearings 104. The inner ring 101 and the outer ring 102 are made from POM (polyoxymethylene, also known as polyacetal). POM is a hard and wear-resistant plastic which is chemically resistant, resistant to solvent and moisture and has stable mechanical properties in the temperature range from 0-90° C. An annular running surface 105 made from a plastic from the group of the polyurethanes (PU) is arranged around the outer ring 102. This plastic is wear-resistant but softer than POM and is likewise chemically resistant, resistant to solvent and moisture and has stable mechanical properties in the temperature range from 0-90° C. PU can be successfully attached to POM: the attachment is in this case implemented without additional chemical means, but rather by virtue of the outer ring 102 and the annular running surface 105 being produced in a single production process. Furthermore, the attachment is boosted mechanically: depressions 105a are arranged in the running surface 105, and elevations 102b are arranged in the outer ring 102, and these depressions and elevations engage on one another.

FIG. 14 shows an alternative embodiment of a conveyor wheel 100 according to the second aspect of the invention. The conveyor wheel 110 shown is suitable for connecting to a carrier for carrying at least one piece of slaughtered poultry and for conveying along a guide. The conveyor wheel 110 comprises an inner ring 111 and an outer ring 112, between which there is a ball bearing structure 113 comprising metal ball bearings 114. The inner ring 111 and the outer ring 112 are made from POM. An annular running surface 115 made from a plastic from the group of polyurethanes (PU) is arranged around the outer ring 112. The PU running surface 115 is connected to the POM outer ring 112 by means of adhesive bonding.

The conveyor wheel 100 (or 110) according to the second aspect of the invention can also be used for a carrier 200 as shown in FIG. 15. In this case, therefore, the conveyor wheel is used as a trolley wheel for a carrier on a known conveyor track. FIG. 15a shows a cross section through the carrier 200, revealing a hook part 201, from which at least one piece of slaughtered poultry (not shown) can be suspended. By means of a bolt 202, the hook part 201 is secured to a connecting element 203, to which two conveyor wheels 100 are also secured by bolts 204. It can be seen in the front view presented in FIG. 15b that in the embodiment shown the connecting element 203 is secured to a drive chain 205, with the result that the carriers 200 advance at a fixed distance from one another. The conveyor wheels 100 roll along a guide 206 comprising two horizontal parts 206a, along which the conveyor wheels 100 roll, and between these horizontal parts a vertical part 206b, as well as a hook-shaped part 206c, by which the guide can be attached, for example, to a beam.

The invention claimed is:

1. A conveyor device for conveying slaughtered poultry or one or more pieces thereof, comprising:
    a plurality of carriers, each carrier being suitable for carrying slaughtered poultry or one or more parts thereof;
    at least one guide that supports the carriers and guides the carriers such that the carriers can move in a conveying direction;
    a drive member that advances parallel to the at least one guide for jointly driving the plurality of carriers in the conveying direction;
    a coupling device associated with each carrier, said coupling device coupling the carrier to the drive member; and
    a decoupling device, the decoupling device being actuable by an actuating member, for selectively decoupling one or more of the carriers from the drive member.

2. The conveyor device according to claim 1, in which the coupling device effects a frictional coupling between the carrier and the drive member.

3. The conveyor device according to claim 1, in which the coupling device effects a magnetic coupling between the carrier and the drive member.

4. The conveyor device according to claim 1, in which the coupling device effects a mechanical coupling between the carrier and the drive member.

5. The conveyor device according to claim 1, in which the coupling device is connected to the carrier.

6. The conveyor device according to claim 1, in which the drive member comprises a rotating wheel with a frictional surface.

7. The conveyor device according to claim 1, in which the guide comprises a rail.

8. The conveyor device according to claim 1, in which the guide comprises a recess arranged along the drive member, in which part of the carrier can engage.

9. The conveyor device according to claim 1, in which the actuating member of the decoupling device is an external mechanism that is not connected to the carrier.

10. The conveyor device according to claim 1, in which the decoupling device is connected to the carrier.

11. The conveyor device according to claim 10, in which the actuating member of the decoupling device is connected to a first carrier, in such a manner that this actuating member can decouple the coupling device of a second carrier.

12. The conveyor device according to claim 11, in which the actuating member of the decoupling device comprises a projecting activation member.

13. The conveyor device according to claim 11, in which the first carrier is located in front of the second carrier, as seen in the conveying direction.

14. The conveyor device according to claim 11, in which the first carrier is located behind the second carrier, as seen in the conveying direction.

15. The conveyor device according to claim 1, in which the decoupling device comprises a mechanical device.

16. The conveyor device according to claim 1, in which the decoupling device comprises a pneumatic device.

17. A method for conveying slaughtered poultry or one or more pieces thereof, said method comprising the step of using the conveyor device according to claim 1.

18. The method for slaughtering poultry according to claim 17, further comprising the steps of:
    conveying the slaughtered poultry or one or more pieces thereof in a conveyor, device; and
    selectively decoupling one or more of the carriers from the drive member.

19. The method according to claim 17, further comprising the step of decoupling coupling means of a second carrier using an actuating member of decoupling means which are connected to a first carrier.

20. The method according to claim 17, in which a plurality of carriers form a waiting line in a buffer, and in which one or more carriers are decoupled in the buffer.

21. A conveyor wheel designed to be connected to a carrier for carrying at least one piece of poultry and to roll along a guide, comprising:
    an outer ring and an inner ring, between which there is a rolling bearing structure with metal rolling bearing elements, the outer ring and inner ring being produced from a hard plastic,
    wherein around the outer ring is arranged an annular running surface made from a plastic with different materials properties.

22. The conveyor wheel according to claim 21, wherein the annular running surface is made from a softer plastic than the outer ring.

23. The conveyor wheel according to claim 21, wherein there is mechanical attachment between the outer ring and the annular running surface.

24. The conveyor wheel according to claim 22, wherein the mechanical attachment is effected by a set of depressions and elevations in the outer ring and in the running surface, which engage in one another.

25. The conveyor wheel according to claim 21, wherein there is chemical attachment between the outer ring and the annular running surface.

26. The conveyor wheel according to claim 21, wherein good attachment between the outer ring and the annular running surface is achieved by producing the outer ring and the annular running surface in one injection-molding process.

27. The conveyor wheel according to claim 21, wherein the inner ring and the outer ring are made from polyoxymethylene (polyacetal, POM).

28. The conveyor wheel according to claim 21, wherein the annular running surface is made from a plastic from the group of the polyurethanes (PU).

29. The conveyor wheel according to claim 21, which is suitable for connecting to a carrier for carrying at least one piece of slaughtered poultry.

30. A conveyor device for conveying slaughtered poultry or one or more pieces thereof, comprising:
    guide;
    carriers for carrying at least one piece of poultry; and
    conveyor wheels according to claim 21, which are to be connected to the carriers and to roll along the guide.

* * * * *